May 26, 1959 F. J. TRECKER 2,888,084
ROTARY GARDENING TOOL
Filed Feb. 16, 1954 2 Sheets-Sheet 1
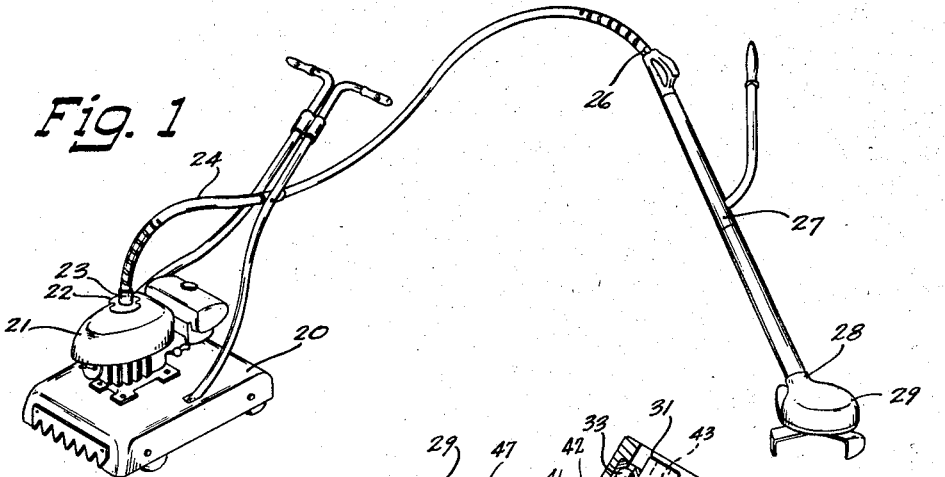
Fig. 1
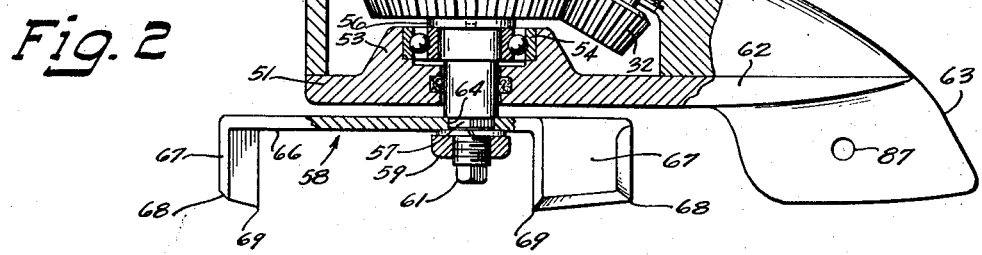
Fig. 2
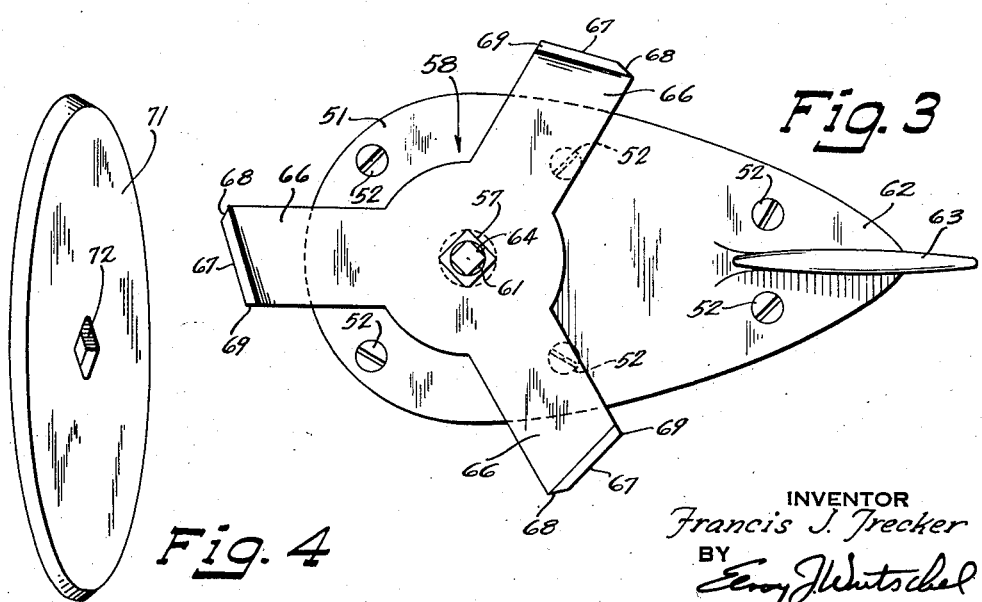
Fig. 3
Fig. 4
INVENTOR
Francis J. Trecker
BY
ATTORNEY May 26, 1959  F. J. TRECKER  2,888,084
ROTARY GARDENING TOOL
Filed Feb. 16, 1954  2 Sheets-Sheet 2
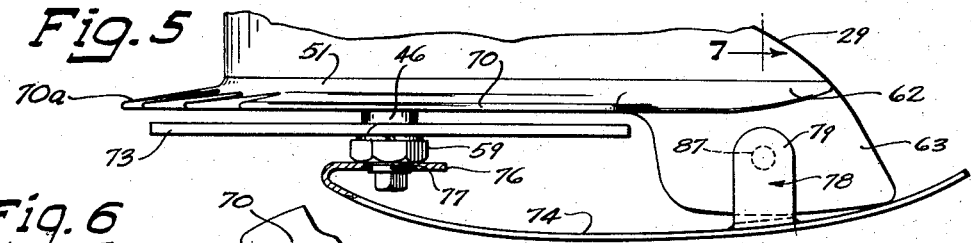
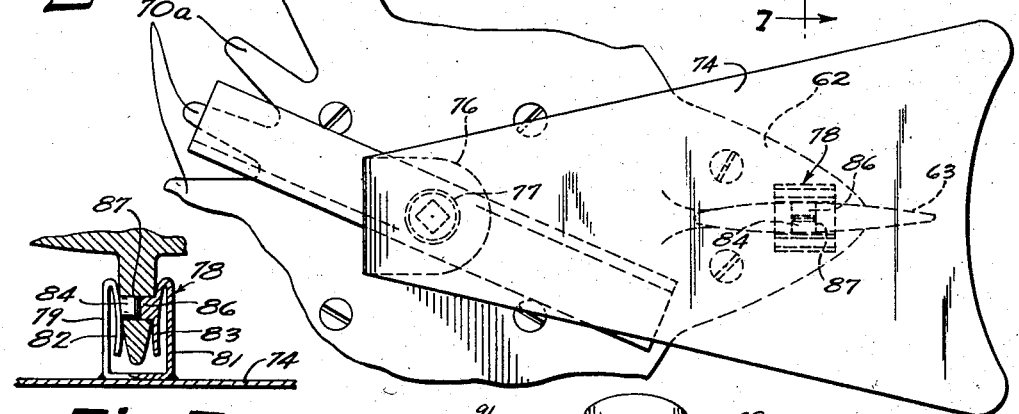
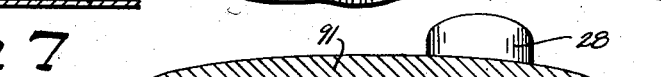
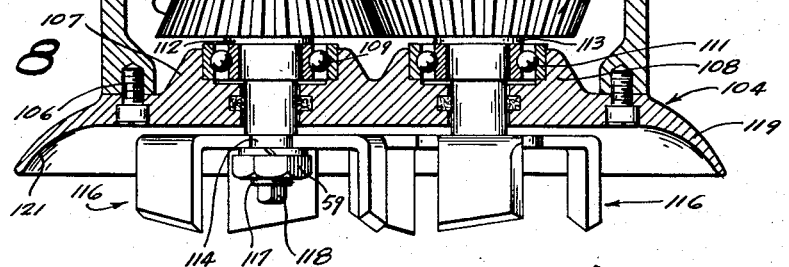
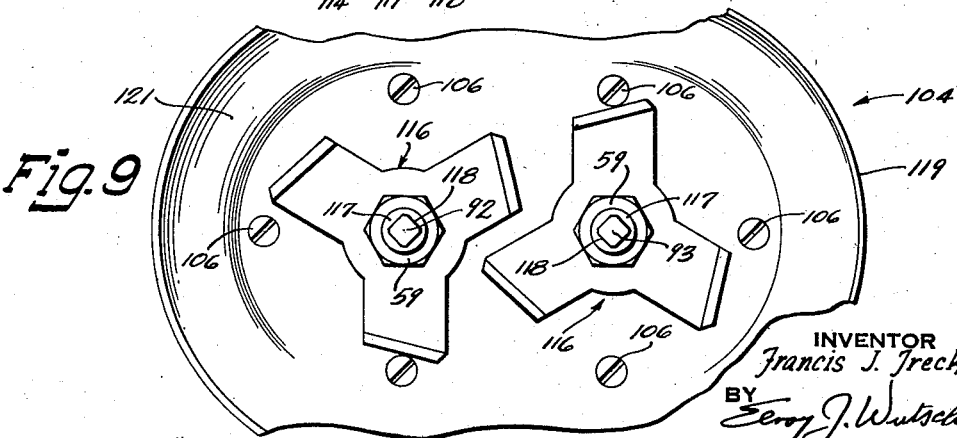
INVENTOR
Francis J. Trecker
BY
Leroy J. Wutschel
ATTORNEY United States Patent Office 2,888,084
Patented May 26, 1959

2,888,084
ROTARY GARDENING TOOL
Francis J. Trecker, Chenequa, Wis.
Application February 16, 1954, Serial No. 410,544
11 Claims. (Cl. 172—41)

This invention relates generally to a gardening tool and more particularly to a rotary hand gardening tool for doing a variety of gardening and landscaping operations.

A general object of the invention is to provide a rotary hand gardening tool.

Another object of the invention is to provide a rotary hand gardening tool which is driven from a portable power source.

Another object of the invention is to provide a positive drive rotary cultivator.

Another object of the invention is to provide a positive drive rotary hand tool adaptable for grass trimming and having means to guide the tool over the ground.

Still another object of the invention is to provide a power operated hand tool for edging along walks and pavements.

According to this invention, a hand tool is constituted by a gear transmission positively driven via a flexible drive shaft from a portable power source, such as a power lawn mower or a light weight portable internal combustion engine; the driven gear of the transmission is provided with a spindle or shaft which is designed to accommodate a cultivating cutter which is power rotated, and has tined elements so constituted that when in engagement with the soil they will slice pieces of packed ground and through rotary force move the ground towards the center of the device, where the ground will be further pulverized by the tines, as the device is advanced. By utilizing this invention, present owners of power mowers can have a multi-purpose tool which is readily adaptable to their present mowers. The combination device is designed to accommodate a cultivator, a grass trimmer for areas inaccessible to power mowers and an edger. All of the accessories being easily secured to the hand tool. A modified version of the invention is shown which is primarily intended as an aid for landscaping and gardening of more extensive home and commercial flower and vegetable gardens. The device is comprised of a gear transmission, driven from the same type of power source, but having a plurality of driven gears each of which has a shaft or spindle to which a cutter is attached, the cutter being so designed that each will intersect the radius of action of the other and, also, that adjacent cutters are contra-rotated to each other.

The foregoing and other objects and advantages of the invention, which will become more fully apparent from the following description, may be achieved by the particular structure shown in and described in the accompanying drawings, in which:

Fig. 1 is a schematic view of the invention shown connected to a portable power source.

Fig. 2 is a vertical longitudinal section of the cultivator incorporating the invention showing the transmission and rotary tool and the depending guide fin.

Fig. 3 is a bottom view of the cultivator shown in Fig. 2.

Fig. 4 is a view in perspective of an edging blade interchangeably adaptable on said tool.

Fig. 5 is a fragmentary side elevation of the device utilizing a grass trimmer blade and having a gliding shoe attached thereto.

Fig. 6 is a bottom view of the device with blade and shoe attached shown in Fig. 5.

Fig. 7 is a fragmentary view taken generally on the line 7—7 of Fig. 5 showing the resilient attaching connection of the shoe to the depending fin.

Fig. 8 is a vertical transverse section in elevation of a modification of the invention showing multiple cultivating cutters.

Fig. 9 is a bottom view of the modified device as exemplified in Fig. 8.

The hand tool of this invention is designed to be utilized with any portable power source presenting a suitable power take-off connection for a flexible drive shaft to which the device may be connected, such as a power lawn mower. The particular power source illustrated in Fig. 1, as an exemplary power source, is a rotary power mower 20 driven by an internal combustion engine 21 affixed thereto. The engine has a power take-off shaft 22 to which a connecting end 23 of a flexible drive shaft 24 is attached; the other end 26 of the flexible shaft 24 is connected to a rigid hollow handle member or tube 27 having a drive shaft rotatably journalled therein. The lower end of the tube 27 is designed to receive an extending shank 28 on a housing 29 of the attachment device. Referring to Fig. 2, the housing 29 is comprised of a concave hollow casting having a hollow shank 28 extending angularly from the top of the housing. A power transmitting shaft 31 having a bevel driving gear 32 secured to its inwardly extending end, is rotatably journalled in bearing 33 and 34 operatively mounted within the shank 28. The bearing 33 is retained by a shoulder 36 integrally formed on the inner bore of the shank 28 and by a bearing spacer 37. The bearing 34 is restrained against axial movement by the spacer 37 and is fixedly secured by means of a washer 38 and snap ring 39. The shaft 31 is held in position by a washer 41 and a snap ring 42. The outer end of the power shaft 31 has a blind bore 43 provided with an internal spline to receive the splined end of the drive shaft which is journalled in the tube 27.

The housing 29 has an internal depending hub 44 to receive one end of a vertical driven shaft 46 which is journalled therein by a sleeve bearing 47. A driven gear 49, integrally formed on the shaft 46, and the power gear 32 are retained in proper meshing engagement by means of a gear hub 48 which engages with the flange face of the bearing 47. The lower end of the driven shaft 46 is journalled in a bottom cover or base plate 51 secured to the housing 29 by means of recessed cap screws 52, Fig. 3. The bottom plate has an upwardly extending hub 53 which supports a bearing 54 journalled on the shaft 46. A hub 56 serves to prevent axial movement of the shaft and gear. The extending end of the driven shaft 46 has formed thereon a squared portion 57 for receiving a multi-tined cutter 58. The cutter is threadedly retained on the shaft by means of a nut 46. The extreme outer end 61 of the shaft 46 is squared for receiving a wrench to hold the shaft when tightening or unloosening the nut 59.

The bottom cover plate 51 is provided with a horizontally and rearwardly extending portion 62 including a vertically depending rigid fin or stabilizer member 63. This member serves to stabilize the course of movement to a straight line whenever the cultivator is operatively guided by an operator in a forwardly direction. The deflector portion 62 while guarding the operator from stones and sticks which might be thrown upwardly by the rotating tines will also cooperate with the vertical stabilizer 63 to restrict cultivator movement to a horizontal plane.

The multi-tined cutter 58 is provided with a square hole 64 in its center to receive the square portion 57 of the shaft 46. The horizontal tines 66 have their free ends 67 turned downwards and formed in a manner that the leading edge 68, Fig. 3, of the individual tines are at a greater radius from the center of the square hole 64 than the trailing edge 69. The depth of the vertical portion 67 of the tines is likewise varied so that at the leading edge the depth is less than at the trailing edge. Thus, the rotation of the tines in packed soil will serve to slice and cultivate the ground rather than permit the soil to pack in and around the rotating tines. The ground will be forced upward towards the rear of the tines and in this manner will be churned because of the moldboard action of the tines. Since each tine is also angularly formed towards the center of the cutter, the ground will be moved inwardly so that it will be re-worked by the tines as the tool is moved forward by the operator.

In Fig. 4 there is shown an edging accessory disc 71 for attachment to the tool in place of the tined cutter 58. The disc 71 is secured on the shaft 46 with the nut 59. In order to use the tool for edging, the tool is manually supported on its side, as shown in Fig. 3, so that the edging disc 71 is disposed in a vertical plane and the operator can rapidly trim or edge grass around walks or pavements or around flower beds from a walking position rather than having a stoop and manually edge such landscaped areas. The power rotation of the edging disc 71 also permits the operator to cut through heavier root growths of other plants and trees which may be present, in a single operation.

In Figs. 5 and 6 there is shown a modified bottom plate 51 which is secured to the housing 29 in the same manner as is the bottom plate shown in Fig. 3. The bottom plate 51, Figs. 5 and 6, is provided with the horizontally and rearwardly extending deflector portion 62 including the vertically depending fin 63 and also having a horizontally and radially extending guard 70 which has a plurality of serrated radially extending fingers 70a, which form the forward portion of the guard. The fingers 70a will, thus, allow grass and weeds to enter into the path of a rotary blade 73, described later, while affording the necessary protection against injury, if the tool is accidentally encountered; the guard also protects the blade from damage if the tool is operated too close to non-yielding objects as posts, trees, rocks and the like.

In Figs. 5 and 6 there is also shown a grass trimming accessory for the tool head. The accessory comprises a rotary blade 73 having a cutting edge provided on the leading edge of each of the arms. The usual square hole (not shown) similar to the square hole 72 in the disc 71 of Fig. 4, is provided in the rotary blade 73. The blade is positioned on the squared portion 57 of the shaft and secured by means of the nut 59. For moving the tool over the ground, a shoe or sled 74 is attached thereto. The shoe is constructed of a thin resilient material in an arcuate shape having a wide trailing or primary bearing surface tapering towards the forward end. The leading end of the shoe 74 is provided with a portion 76 bent upwardly and rearwardly and is provided with a circular hole 77. The hole 77 is of a larger diameter than the threaded portion of the power driven shaft 46, but smaller than the diameter of the nut 59 so that the shoe is operatively supported thereon. Referring now to Figs. 5, 6 and 7, there is provided a unique means for securing the shoe 74 to the tool. A resilient spring clip 78 secured to the top of the shoe 74 is provided with two upstanding arms 79 and 81 each of which are, in turn, provided with resilient tabs 82 and 83. The tabs each have locating pins 84 and 86 which are resiliently urged inwardly in a manner that the faces of the pins are normally abutting each other due to the combined resilient inward urging of the tabs 82 and 83 and the arms 79 and 81. The locating pins are adapted to be insertable in a retaining hole 87 provided in the vertically disposed fin 63, see Figs. 2, 5 and 7. Thus, when the blade 73 is secured to the shaft 46 of the hand tool, the shoe 74 is snapped on the fin 63 by means of the clip 78. Due to the shape of the shoe 74, the center of the hole 77 in the forward portion 76 will approximately overlie the center of the shaft 46; thus, when the shoe 74 is attached, the same will be retained in on operative position on the hand tool without any appreciable shifting thereon.

A modification of the invention is shown in Figs. 8 and 9, wherein the hand tool is provided with a plurality of driven shafts, in this instance, two, each having a multitined cutter 116 secured thereon for contra-rotation therewith. The concave oval housing 91 has an extending shank 28 with a power shaft 31 and power gear 32 journalled therein, as shown in Fig. 2. Two driven shafts 92 and 93 are journalled within the housing 91 in depending hubs 94 and 96 which have sleeve bearings 97 and 98. The driven shafts 92 and 93 have secured to them bevel driven gears 99 and 101. The bevel driven gear 101 is retained in proper meshing engagement with the power gear 32 (not shown) by means of the gear hub 102 which engages with the flange face of the bearing 98. The bevel driven gear 99 is retained in proper meshing engagement with the bevel driven gear 101 by means of the gear hub 103 which engages with the flange face of the bearing 97. The lower ends of the driven shafts 92 and 93 are journalled in a bottom cover plate 104 secured to the housing 91 by means of recessed cap screws 106. The cover plate 104 has upwardly extending hubs 107 and 108 which support bearings 109 and 111 journalled on the shafts 92 and 93 respectively. The hubs 112 and 113 of the driven gears 99 and 101 serve to prevent axial movement of the respective shafts and gears. The extending ends of the driven shafts 92 and 93 are formed identically to that of the extending end of shaft 46 shown in Fig. 2, having a squared portion 114 for receiving the multi-tined cutters 116 and a threaded portion 117 upon which the retaining nut 59 is threaded for securing the multi-tined cutters 116 to the shafts and a squared end 118 for a hold wrench. Thus, when the power gear rotates the bevel gear 101 it will rotate the bevel gear 99 in the opposite direction and the multi-tined cutters 116 secured to the shafts 92 and 93 will be driven in opposite directions.

The bottom cover plate 104 has a depending outwardly and downwardly extending protecting shield 119 presenting a curved inner surface 121. The shield 119 extends down and around the cultivator tines a sufficient distance to give effective protection to the operator from any stones or sticks which might be thrown upwardly by the oppositely rotating cultivator cutters 116.

The multi-tined cultivator cutters 116 are similar to the cutter 58 shown in Fig. 2. The cutters are secured to the shafts 92 and 93 in the same manner as is the cutter 58. However, the cutters 116, as shown in Fig. 9, are so positioned on their individual shafts so that the tines of each will intersect the radius of action of each other without coming in contact with each other. Since the direction of rotation of the cutters 116 is inwardly, the action will aid in moving the tool forward and as they are contra-rotating, will stabilize the tool in a straight line movement.

While the form of the invention illustrated is a preferred one, it is not intended that the particular arrangement of the several parts thereof be strictly adhered to, but that changes in details of construction and arrangement of the parts may be made without departing from the spirit and scope of the invention as set forth in the appended claims.

Having thus set forth the principles of the invention in connection with the foregoing description of an illustrative preferred embodying structure, I hereby claim as my invention or discovery:

1. In a hand tool for a portable power source the combination of a housing, a bottom cover plate on said housing, a deflector plate extending rearwardly from said cover plate, a vertical fin depending from said deflector portion, a driving shaft having a driving gear secured thereon rotatably journalled in said housing, rotating means connecting said driving shaft and said source of power, a driven shaft rotatably journalled in said bottom plate with its axis in front of and in longitudinal alignment with said vertical fin, a driven gear secured to said driven shaft, said driven gear and said driving gear being in constant meshing engagement, a multi-tine cutter detachably secured to said driven shaft for rotation therewith.

2. In a hand tool for a portable power source the combination of a housing including a bottom plate having a horizontal and rearwardly extending deflector surface provided with a depending vertical stabilizing fin provided with a pin receiving hole therein, a rotary gear transmission within said housing, operable driving means connected to said source of power and said transmission, a depending shaft journalled in said bottom plate secured to a driven gear of said transmission, a rotary blade detachably secured to said shaft, and an arcuated resilient glide shoe being provided forwardly with a shaft receiving hole and rearwardly with a resilient clip having arms provided with an inwardly extending pin for engagement with the hole in said fin whereby said shoe is resiliently secured to said tool so that said tool may readily glide over the ground.

3. In a hand tool for a portable power source, a housing having an upward angularly extending shank, a bottom plate removably secured to said housing, said plate having an extending deflector portion including a depending vertical fin provided with a locating hole, a driving shaft rotatably journalled in said shank and detachably connected to said source of power, a spindle rotatably journalled in said bottom plate, interconnecting gearing between said drive shaft and said spindle, a rotary blade detachably secured to said spindle, and a resilient arcuate glide shoe having a rearwardly extending resilient arm from the forward end thereof provided with a spindle receiving hole and a resilient securing clip positioned rearwardly on said arcuate shoe, said clip comprising a pair of spaced apart parallel resilient arms each of said arms provided with an inwardly and downwardly extending resilient tab provided with an inwardly extending locating pin for engagement with said locating hole in said fin whereby when said rotary blade is secured to said spindle said glide shoe may be secured to said fin by having the arms of said clip engage opposite sides of said fin and said pins will engage the hole in said fin and said spindle receiving hole will be engaged with said spindle to resiliently secure said shoe to said tool.

4. In a glide shoe for a hand tool having a depending rotating spindle and a depending stabilizing fin provided with a locating hole, an arcuate resilient contact plate presenting a tapering contact surface, a resilient arm extending rearwardly from the narrow end of said contact plate, said arm provided with a hole for receiving said depending spindle, a resilient clip secured to the concave surface of said arcuate plate rearwardly of said narrow end, said clip comprising a base, a pair of resilient parallel spaced apart arms extending perpendicular from said base, and an inwardly and downwardly extending resilient tab on each of said arms provided with a locating pin on the inner surface of said tab for engagement with said locating hole in said fin whereby said arms will be frictionally and resiliently engageable with said depending fin and said pins will be engageable into said hole in said fin and said spindle will be received by the spindle receiving hole to resiliently secure said shoe to said tool.

5. In a hand tool for a portable power source the combination of a housing having an upward angularly extending shank, a bottom plate removably secured to said housing, said plate having a rearwardly extending deflector portion including a depending fin provided with a pin receiving bore and a peripheral horizontally extending guard provided with a plurality of serrated radially extending fingers on the forward periphery thereof, a driving shaft rotatably journalled in said shank detachably connected to said source of power, a spindle rotatably journalled in said bottom plate, interconnecting gearing between said spindle and said drive shaft, a rotary blade detachably secured to said spindle, and a resilient arcuate glide shoe having a rearwardly extending arm from the forward end thereof provided with a spindle receiving hole, and a resilient securing clip positioned rearwardly on said shoe, said clip comprising a pair of spaced apart parallel resilient arms each of said arms having an inwardly and downwardly extending resilient tab provided with an inwardly extending locating pin for engagement with said bore in said fin whereby when said rotary blade is secured to said spindle said glide shoe may be secured to said fin by having the arms of said clip engage opposite sides of said fin and said pins will be engaged in the bore in said fin and said spindle receiving hole will be engaged with said spindle to resiliently secure said shoe to said tool.

6. In a garden appliance arranged to be actuated by a source of power, a housing having an open bottom, a base plate attached to said housing to close its bottom, a tool retaining spindle journalled in said housing and connected to be rotated by said source of power, said spindle extending through said base plate so that its end protrudes through said base plate exteriorly of said housing, a garden tool secured to the protruding end of said spindle to rotate with it adjacent to said base plate, a deflector plate extending rearwardly of said base plate to contact the surface of the soil for guiding the appliance for movement along the surface of the soil, and a stabilizer fin depending from said deflector plate immediately to the rear of said garden tool to penetrate the soil and thereby minimize sidewise creeping of the appliance from the action of said garden tool operating in the soil, whereby the appliance may be conveniently moved in a desired path by the operator while it is being operated to perform its function.

7. In a gardening appliance arranged to be actuated by a source of power, a housing having an open bottom, a base plate attached to said housing to close its bottom, a tool retaining spindle journalled in said housing and connected to be rotated by said source of power, said spindle extending through said base plate so that its end protrudes through said base plate exteriorly of said housing, a garden tool secured to the protruding end of said spindle to rotate with it adjacent to said base plate with the end of said spindle extending beyond the outer face of said tool, a deflector plate extending rearwardly of said base plate to contact the surface of the soil for guiding the appliance for movement along the surface of the soil, and a stabilizer fin depending from said deflector plate immediately to the rear of said garden tool to penetrate the soil and thereby minimize sidewise creeping of the appliance from the action of said garden tool operating in the soil, said fin having an opening therein, whereby the extending end of said spindle and the opening in said fin may be conveniently utilized for coupling an attachment to the appliance to render said stabilizer fin and deflector plate inoperative by preventing them from engaging the soil so that a variety of gardening operations may be performed with the appliance.

8. In a rotary cultivator unit arranged to be actuated by a source of power, a housing having an open bottom, a base plate attached to said housing to close its open bottom, a tool retaining spindle journalled in said housing and connected to be rotated by said source of power, said spindle extending through said base plate so that its end protrudes through said base plate exteriorly of said housing, a cultivating tool secured to the protruding end of said spindle to rotate with it adjacent to said base plate, with the end of said spindle extending beyond the outer face of said tool, and a stabilizer fin depending from said base plate immediately to the rear of said cultivating tool to penetrate the soil broken up by said cultivating tool and thereby minimize sidewise creeping of the unit from the action of said cultivating tool operating in the soil, said fin having an opening therein, whereby the unit may be employed for cultivating soil and the extending end of said spindle and the opening in said fin may be utilized for coupling an attachment to the unit to render it capable of performing other operations.

9. In a rotary cultivator unit arranged to be actuated by a source of power, a housing having an open bottom, a base plate attached to said housing to close its open bottom, a tool retaining spindle journalled in said housing and connected to be rotated by said source of power, said spindle extending through said base plate so that its end protrudes through said base plate exteriorly of said housing, a cultivating tool secured to the protruding end of said spindle to rotate with it adjacent to said base plate with the end of said spindle extending beyond the outer face of said tool, a deflector plate extending rearwardly of said base plate to contact the soil for guiding the unit for movement along the surface of the soil, and a stabilizer fin depending from said deflector plate immediately to the rear of said cultivating tool to penetrate the soil broken up by said cultivating tool and thereby minimize sidewise creeping of the unit from the action of said cultivating tool operating in the soil, said fin having an opening therein, whereby the unit may be employed for cultivating soil and the extending end of said spindle and the opening in said fin may be conveniently utilized for coupling an attachment to the unit to render it capable of performing other operations.

10. In a rotary cultivator unit arranged to be actuated by a power source, a housing having an open bottom, a base plate attached to said housing to close its open bottom, a tool retaining spindle journalled in said housing and base plate, and connected to be rotated by said power source, said spindle extending through said base plate so that its end protrudes through said base plate exteriorly of said housing, a multiple bladed cultivating tool having depending tines secured to the protruding end of said spindle to rotate with it adjacent to said base plate, the end of said spindle extending beyond the outer face of said tool, and a stabilizer fin depending from said base plate immediately to the rear of said cultivating tool in alignment with the axis of said spindle to penetrate the soil broken up by said cultivating tool and thereby minimize sidewise creeping of the unit from the action of said cultivating tool operating in the soil, said fin having a lateral opening formed in it, whereby the unit may be employed for cultivating soil and the extending end of said spindle and the opening in said fin may be utilized for coupling an attachment to the unit to render it capable of performing other operations.

11. In a rotary cultivator unit arranged to be actuated by a power source, a housing, a shaft rotatably mounted in said housing and connected to be driven by the power source, a pinion fixed to said shaft to rotate with it, a base plate attached to said housing, a tool retaining spindle journalled in said housing and base plate, and extending through said base plate so that its end protrudes exteriorly of said base plate, a driven gear keyed to said spindle and in meshing engagement with said pinion, a multiple baled cultivating tool having depending tines mounted on the protruding end of said spindle adjacent to said base plate, a nut threaded on the protruding end of said spindle to fix said cultivating tool to said spindle, said nut being threaded on said spindle sufficiently so that the end of said spindle extends beyond the exposed face of said nut, and a stabilizer fin depending from said base plate immediately to the rear of said cultivating tool to penetrate the soil broken up by said cultivating tool and thereby minimize creeping of the unit due to the action of said cultivating tool operating in the soil, said fin having an opening therein, whereby the unit may be employed for cultivating soil, and the extending end of said spindle and the opening in said fin may be utilized for coupling an attachment to the unit to render it capable of performing other operations.

References Cited in the file of this patent

UNITED STATES PATENTS

| Re. 21,289 | Orr | Dec. 5, 1939 |
| 975,544 | Lindsey | Nov. 15, 1910 |
| 1,155,351 | Gleiche | Oct. 5, 1915 |
| 1,420,309 | Drake | June 20, 1922 |
| 1,550,342 | Cogley | Aug. 18, 1925 |
| 2,082,476 | Allen | June 1, 1937 |
| 2,172,302 | Tinnerman | Sept. 5, 1939 |
| 2,253,452 | Urschel | Aug. 19, 1941 |
| 2,574,237 | Barrow | Nov. 6, 1951 |
| 2,582,364 | Tice | Jan. 16, 1952 |
| 2,625,867 | Hands | Jan. 20, 1953 |
| 2,699,605 | Setter | Jan. 18, 1955 |